US011479309B2

(12) United States Patent
Voigt et al.

(10) Patent No.: US 11,479,309 B2
(45) Date of Patent: Oct. 25, 2022

(54) PLANT CHASSIS LEVELING APPARATUS, SYSTEMS AND METHODS

(71) Applicant: Superior Industries, Inc., Morris, MN (US)

(72) Inventors: Matthew Voigt, Corcoran, MN (US); Brett Nelson, Hancock, MN (US); Scott Oberg, New London, MN (US)

(73) Assignee: SUPERIOR INDUSTRIES, INC., Morris, MN (US)

( * ) Notice: Subject to any disclaimer, the term of this patent is extended or adjusted under 35 U.S.C. 154(b) by 693 days.

(21) Appl. No.: 16/472,347

(22) PCT Filed: Dec. 22, 2017

(86) PCT No.: PCT/US2017/068097
§ 371 (c)(1),
(2) Date: Jun. 21, 2019

(87) PCT Pub. No.: WO2018/119350
PCT Pub. Date: Jun. 28, 2018

(65) Prior Publication Data
US 2020/0122795 A1   Apr. 23, 2020

Related U.S. Application Data

(60) Provisional application No. 62/437,788, filed on Dec. 22, 2016.

(51) Int. Cl.
*B60S 9/10* (2006.01)
*B62D 55/116* (2006.01)
*G05B 19/43* (2006.01)
*G01L 7/18* (2006.01)

(52) U.S. Cl.
CPC .............. *B62D 55/116* (2013.01); *B60S 9/10* (2013.01); *G05B 19/43* (2013.01); *G01L 7/18* (2013.01)

(58) Field of Classification Search
CPC ......... B62D 55/116; B60S 9/10; G05B 19/43; G01L 7/18
See application file for complete search history.

(56) References Cited

U.S. PATENT DOCUMENTS

| 3,623,301 | A |  | 11/1971 | Hofer |
| 4,598,875 | A |  | 7/1986 | Bronson et al. |
| 4,923,597 | A |  | 5/1990 | Anderson et al. |
| 5,359,837 | A |  | 11/1994 | Schumacher et al. |
| 10,375,890 | B2 | * | 8/2019 | Ramp .................. A01D 41/127 |

(Continued)

FOREIGN PATENT DOCUMENTS

| AT | 410291 B * | 2/2003 | .......... G05B 19/414 |
| EP | 1520465 A1 * | 4/2005 | .......... A01D 75/285 |

(Continued)

OTHER PUBLICATIONS

International Search Report and Written Opinion, PCT Application No. PCT/US2017/068097, dated Feb. 22, 2018, 13 pages.

*Primary Examiner* — Jacob B Meyer
(74) *Attorney, Agent, or Firm* — Larkin Hoffman

(57) ABSTRACT

Systems, methods and apparatus are provided for leveling and/or supporting a plant chassis. In some embodiments, a first set of actuators carry out a leveling routine and a controller monitors a pressure in a second set of actuators as the second set of actuators is extended.

19 Claims, 8 Drawing Sheets

(56) References Cited

U.S. PATENT DOCUMENTS

| | | | |
|---|---|---|---|
| 2010/0030425 A1* | 2/2010 | Holbrook | B60G 17/0155 |
| | | | 280/6.153 |
| 2011/0174907 A1 | 7/2011 | Davis et al. | |
| 2016/0113200 A1* | 4/2016 | Gofron | A01D 41/141 |
| | | | 701/50 |
| 2016/0332681 A1 | 11/2016 | Missotten et al. | |
| 2018/0163364 A1* | 6/2018 | Huissoon | E02F 9/003 |
| 2018/0290634 A1* | 10/2018 | Belley | B66F 3/26 |
| 2020/0122540 A1* | 4/2020 | Rife, Jr. | B62D 55/116 |
| 2020/0122795 A1* | 4/2020 | Voigt | G05B 19/43 |

FOREIGN PATENT DOCUMENTS

| | | | | |
|---|---|---|---|---|
| EP | 1586780 B1 * | 6/2007 | | F15B 13/0817 |
| WO | WO-2005005178 A2 * | 1/2005 | | B60G 17/0155 |

* cited by examiner

PLANT CHASSIS LEVELING APPARATUS, SYSTEMS AND METHODS

BACKGROUND

Plant chassis such as portable plant chassis are used to operably support equipment for processing materials (e.g., aggregate materials) such as crushing, screening and conveying equipment, among others.

DESCRIPTION

Figure 1:
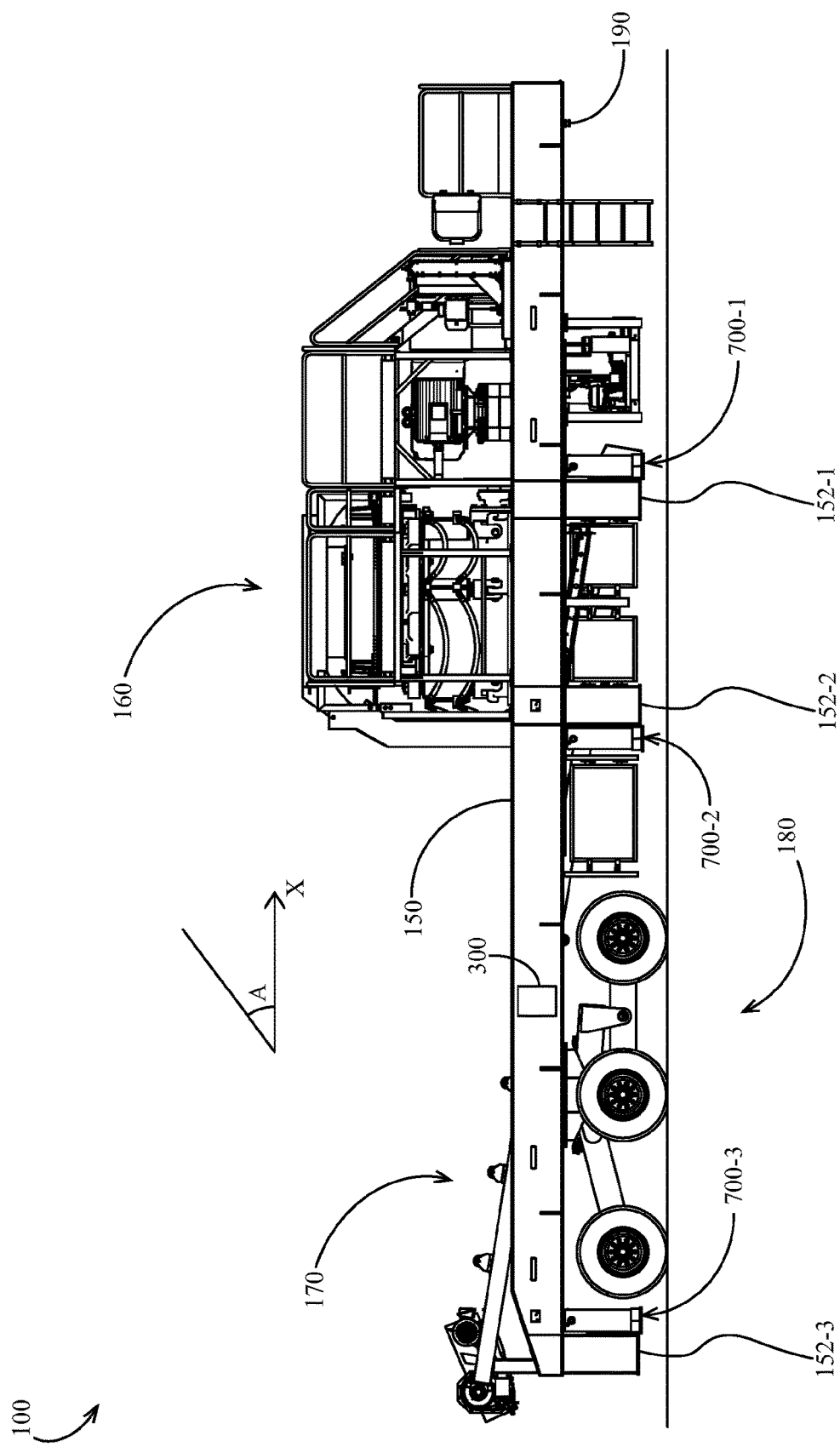
FIG. 1 is a side elevation view of an embodiment of a plant chassis.
Figure 4:
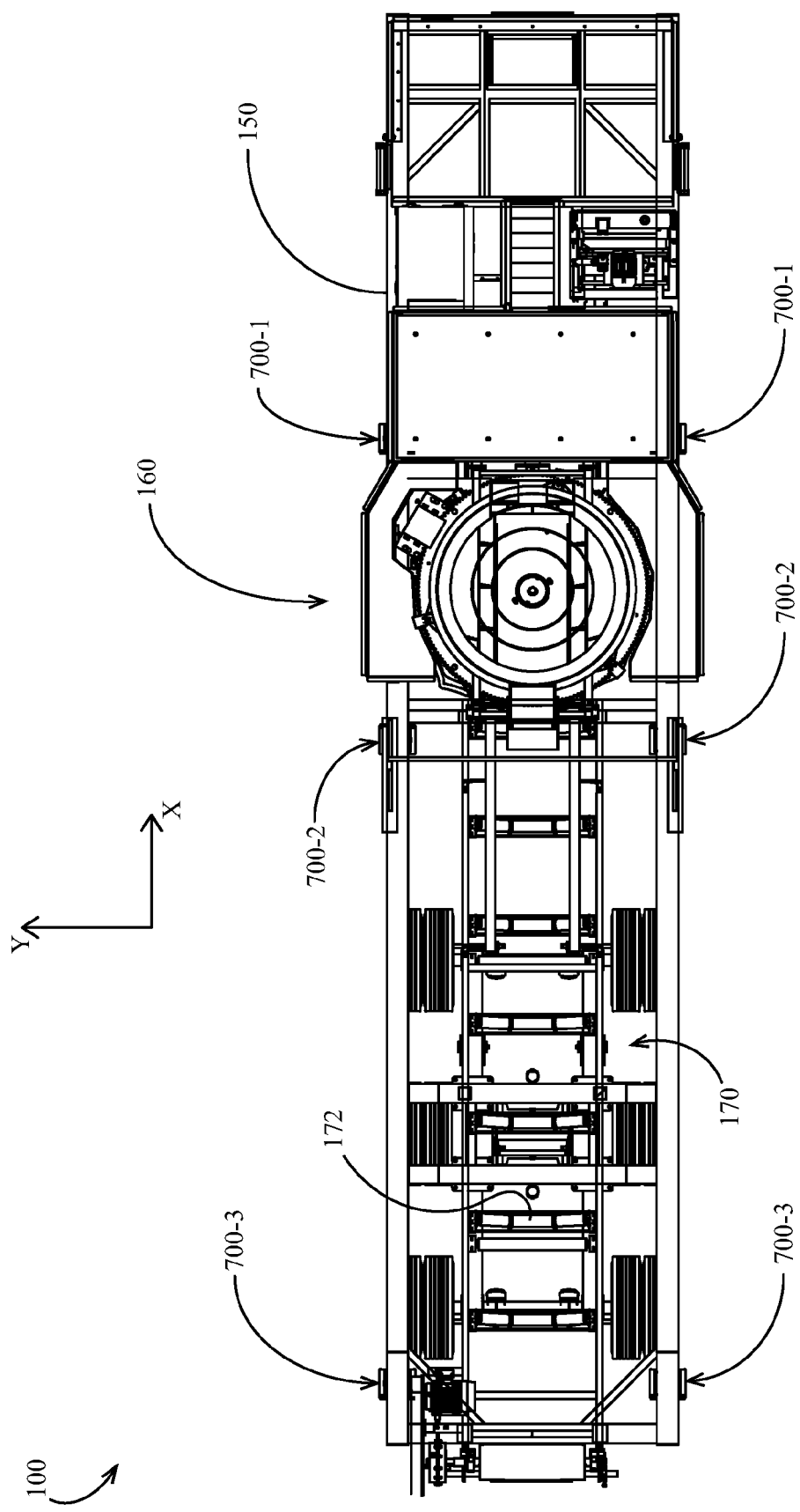
FIG. 4 is a plan view of the portable plant chassis of FIG. 1.
Figure 9:
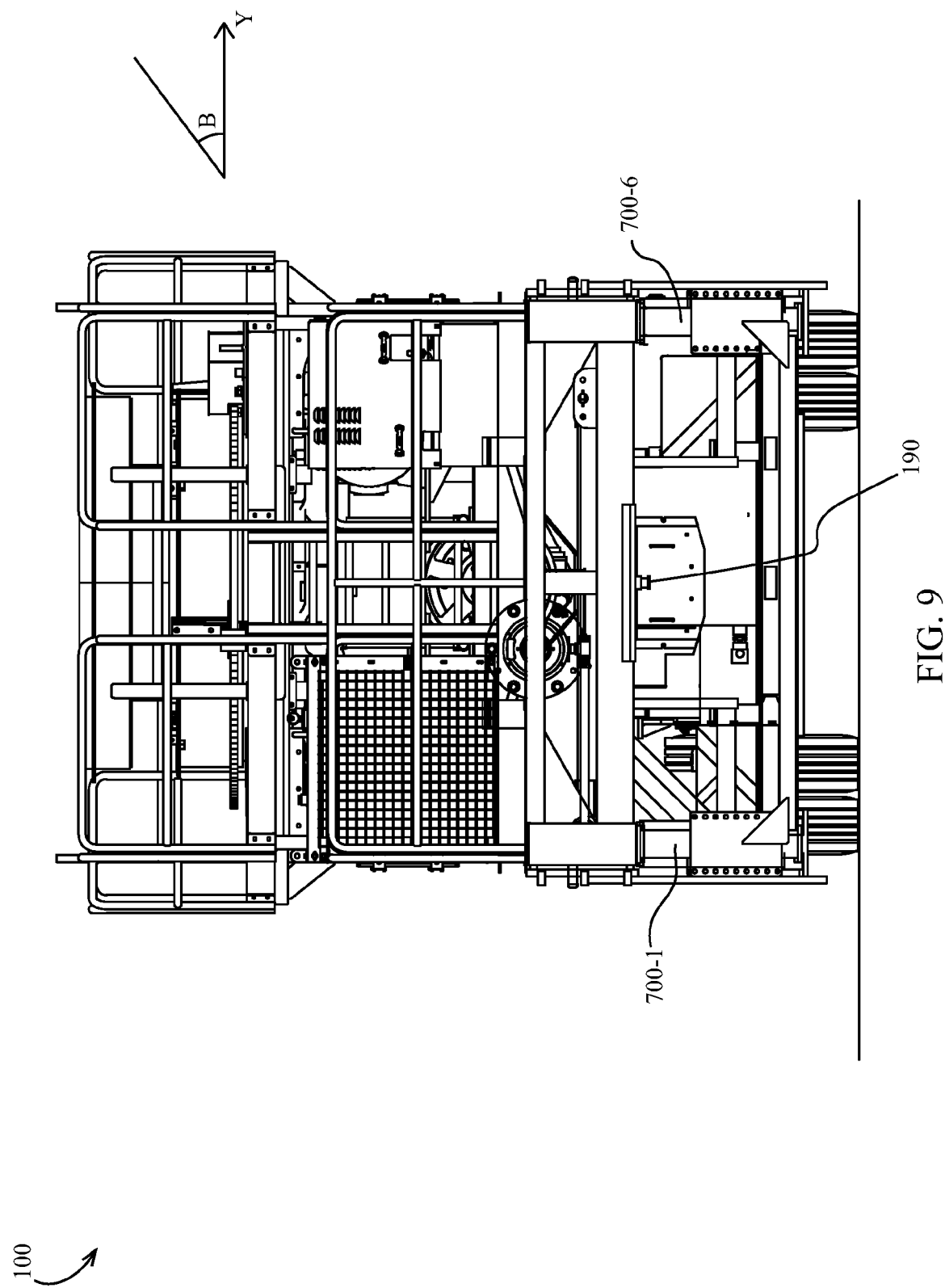
FIG. 9 is a front elevation view of the plant chassis of FIG. 1.

Plant chassis leveling systems, methods and apparatus are disclosed herein. Some system embodiments include leveling actuators and support actuators. Some systems include one or more inclination sensors for measuring an inclination of a plant chassis and/or pressure sensors for measuring a pressure in one or more support actuators. Some methods include performing a leveling routine with the leveling actuators and performing a support routine with the support actuators Referring to the drawings, wherein like reference numerals designate identical or corresponding parts throughout the several views, FIGS. 1, 4 and 9 illustrate an embodiment of a plant chassis 100. The illustrated plant chassis 100 includes a frame 150 which is optionally configured to support processing equipment (e.g., aggregate material and/or mineral processing equipment). In the illustrated embodiment, the frame 150 optionally supports a crusher 160 (e.g., a cone crusher) and optionally supports a conveyor 170 (e.g., for rollingly supporting a conveyor belt on a series of conveyor idlers 172) which may be configured to convey output materials from the crusher 160. In various embodiments, the frame 150 alternatively or additionally supports various other equipment such as jaw crushers, impactors (e.g., horizontal shaft impactors, vertical shaft impactors), vibratory classifying equipment (e.g., horizontal screens, inclined screens, grizzly feeders), hydrocyclones, classifying tanks, dewatering screens, sand screws, telescoping conveyors, etc.

The plant chassis 100 is optionally transportable. In some embodiments, in a transport configuration the plant chassis 100 is supported on a wheel assembly 180 during transport. In some embodiments, the plant chassis 100 is drawn by a vehicle (not shown) such as by a towing connection 190. In other embodiments, the plant-chassis 100 is part of a vehicular portable plant (e.g., supported on driven tracks or wheels which may be powered by an engine supported by the plant).

In an operational configuration, the plant chassis 100 is optionally supported by a plurality of extendable legs 700, various embodiments of which are described in more detail herein. In the illustrated embodiment, the plant chassis 100 includes six extendable legs 700-1 through 700-6. In other embodiments, the plant chassis 100 is supported by any suitable number of legs for the weight and size of the chassis (e.g., 4, 6, or 8 legs; between 1 and 10 legs). In some embodiments, the plant chassis 100 may be supported in an operational configuration by a combination of fixed-length and stationary legs (e.g., one or two fixed-length legs disposed to support one end of the plant chassis and 2, 4 or 6 extendable-legs disposed to support the remainder of the plant chassis).

Due at least in part to the potential variability of terrain on which the plant chassis 100 may be supported, in some embodiments the degree of extension of each leg 700 optionally at least partially modifies the orientation of the plant chassis. An illustrative orientation angle A is shown in FIG. 1 as being measured relative to (e.g., above) horizontal direction X (which in some embodiments may be a longitudinal direction parallel to the direction of travel of the plant during transport). An illustrative orientation angle B is shown in FIG. 9 as being measured relative to (e.g., above) horizontal direction Y (which may be a direction perpendicular to the direction X and in some embodiments may be a lateral direction perpendicular to the direction of travel). In one example, with reference to FIG. 1, extending the legs 700-1 and/or 700-6 in the illustrated embodiment optionally tends to increase the angle A. In another example, with reference to FIG. 9, extending the legs 700-4 and/or 700-6 optionally tends to increase the angle B.

In some embodiments, support blocks 152 may be mounted to and extend downward from the frame 150. Support blocks 152 may comprise W-beams, I-beams, or other beams or suitable support structure. In some embodiments, each leg 700 may be mounted to an associated block 152 and/or directly to the frame 150. In some examples, external supports material (not shown) such as cribbing material (e.g., metal or wood) or separate jacks may be positioned beneath one or more blocks 152 to support the frame 150 once leveling operations have been completed.

Figure 8:
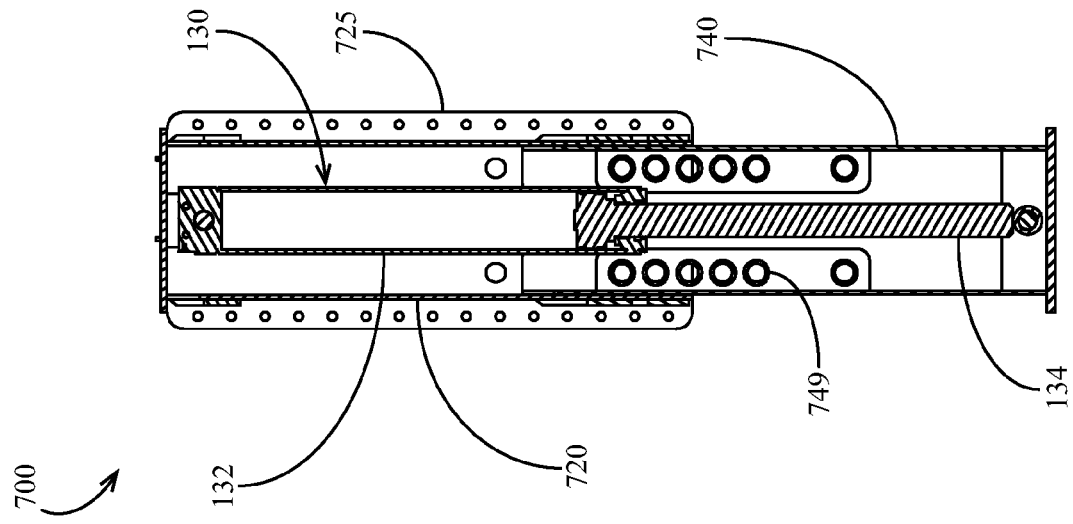
FIG. 8 is a view of the support leg of FIG. 7 along the section 8-8 of FIG. 7.
Figure 7:
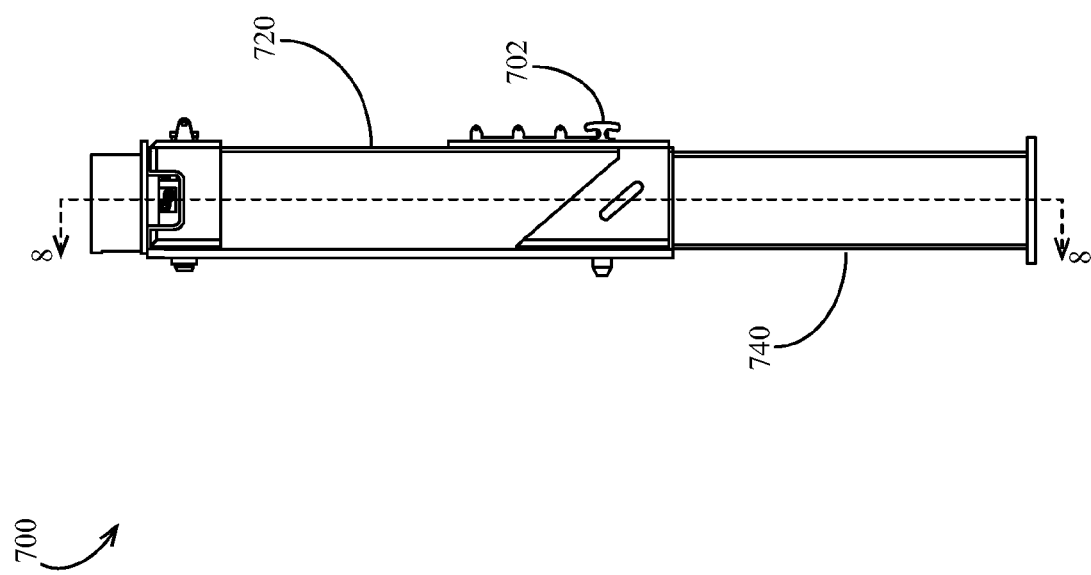
FIG. 7 is a side elevation view of an embodiment of a support leg of the plant chassis of FIG. 1.

Referring to FIGS. 7 and 8, an example of an extendable leg 700 is illustrated optionally including an actuator 130 (e.g., a hydraulic actuator such as a dual-acting actuator) for extending and retracting the leg. In some embodiments, leg comprises an upper portion 720 moveable relative to a lower portion 740. In some embodiments the upper portion and lower portion are slidingly engaged with each other. In various embodiments, the upper portion and/or lower portion may each comprise metal tubes, beams or channels. The upper portion 720 is optionally mounted to one of the blocks 152 such as by a mounting flange 725. The actuator 130 optionally includes a cylinder 132 coupled to the upper portion 720 and a rod 134 coupled to the lower portion 740. Thus in some embodiments, communication of fluid to a head end of cylinder 132 tends to extend actuator 130 and thus extend the leg 700. Similarly, communication of fluid to a rod end of cylinder 132 tends to retract actuator 130 and thus retract the leg 700.

In some embodiments, a selected degree of extension of legs 700 may be retained by maintaining the corresponding amount of fluid in the head and rod ends of the cylinder 132. In some embodiments, a selected degree of extension of legs 700 may additionally or alternatively be retained using a mechanical locking mechanism. For example, in the illustrations of FIGS. 7 and 8, an optional series of vertically spaced locking holes 749 is shown which may be included in some embodiments in the lower portion 740. In such embodiments, a pin 702 may optionally be inserted through an opening (not shown) in the upper portion 720 and through one of the openings 749 in order to mechanically retain the extension of the leg 700.

Figure 2:
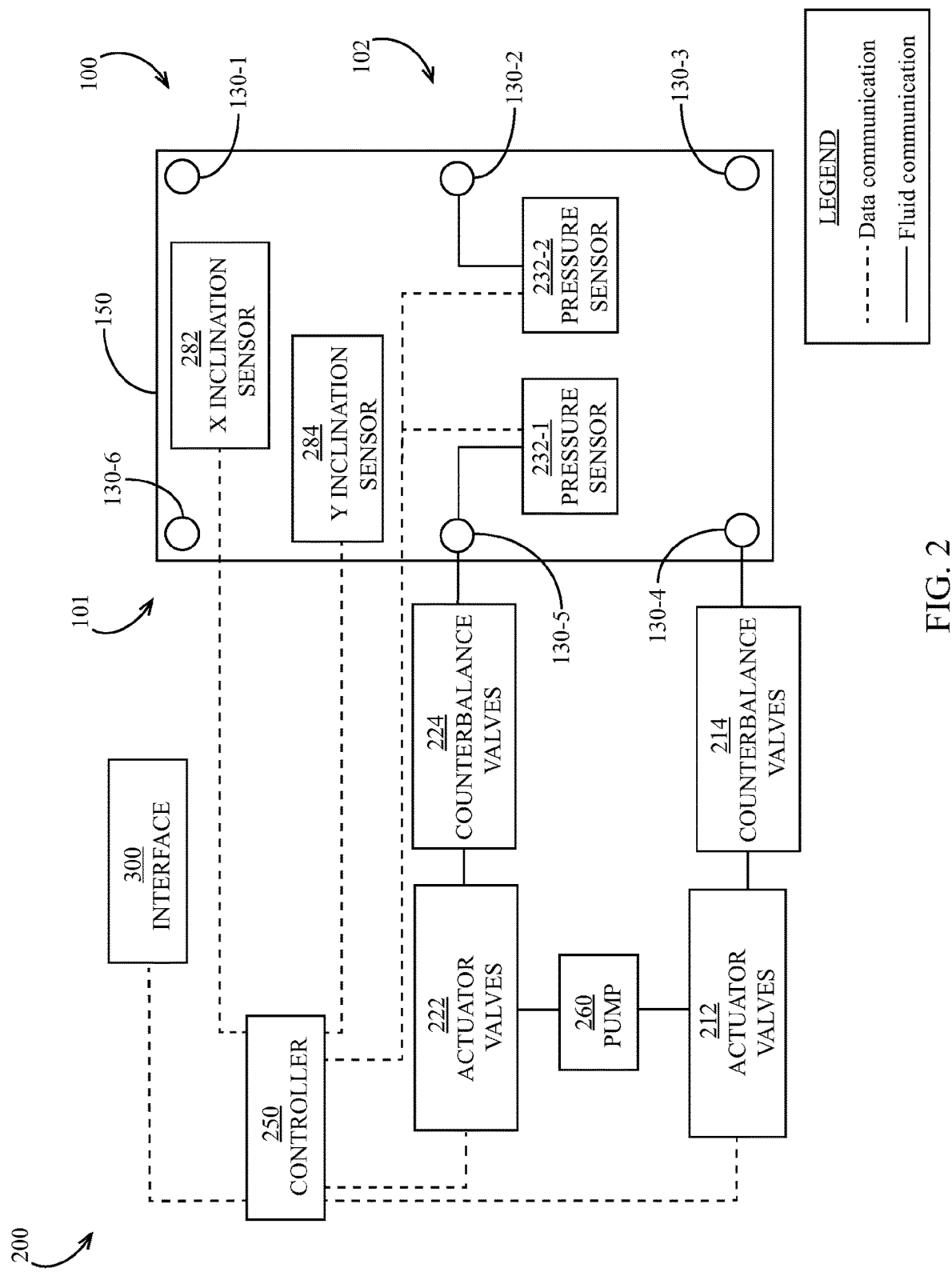
FIG. 2 schematically illustrates an embodiment of a leveling system for leveling a plant chassis.

Referring to FIG. 2, an embodiment of a control system 200 for leveling and/or supporting a plant chassis is illustrated. It should be appreciated that the control system embodiments described herein may be adapted to control a variety of plants having various configurations.

The control system 200 optionally includes a pump 260 (e.g., a hydraulic pump) in fluid communication with each of the actuators 130 (e.g., with the head end and/or rod end of each cylinder 132). The actuators 130 optionally comprise a first actuator set 101 (e.g., actuators 130-1, 130-3, 130-4, 130-6) which may be disposed generally at the corners, sides, or other portions of the frame 150 and a second actuator set 102 (e.g., actuators 130-2, 130-4) which may be disposed generally in central, medial or other portions of the frame 150. In some embodiments, the first actuator set may be used to level the frame 150 in a first leveling routine and the second actuator set may be used to add support to the frame 150 in a second leveling routine.

The control system 200 optionally includes a first inclination sensor 282 which in some embodiments is mounted to the frame 150. The first inclination sensor 282 is optionally disposed to measure the inclination along a first direction (e.g., the angle A relative to horizontal measured along the direction X). The first inclination sensor 282 is optionally in data communication with a controller 250 and/or user interface 300 for communicating inclination signals.

The control system 200 optionally includes a second inclination sensor 284 which in some embodiments is mounted to the frame 150. The second inclination sensor 284 is optionally disposed to measure the inclination along a second direction (e.g., the angle B relative to horizontal measured along the direction X). The second inclination sensor 282 is optionally in data communication with a controller 250 and/or user interface 300 for communicating inclination signals.

In various embodiments, the inclination sensors 282, 284 comprise various sensors and/or devices configured to measure an inclination of the frame 150 and/or configured to change an operational state when an inclination of the chassis changes or reaches a predetermined range (e.g., tilt sensor, gyroscope, accelerometer, etc.). The inclination sensors may additionally or alternatively measure a rate of change of orientation and/or inclination of the frame 150. In some embodiments, each of the inclination sensors comprises an inclination sensor such as Model No. INX360D-F99-I2E2-V15 available from Pepperl+Fuchs in Mannheim, Germany.

The control system 200 optionally includes one or more pressure sensors 232 (e.g., 232-1 and 232-2) for measuring a pressure in the cylinders 132 (e.g., in the head end and/or rod end thereof). In some embodiments, the pressure sensor comprises an electronic pressure monitor such as model no. PK6220 available from IFM Efector in Malvern, Pa. Each pressure sensor 232 is optionally mounted to and/or fluidly coupled to the cylinder 132; alternatively, each pressure sensor is fluidly coupled to a fluid line (e.g., hydraulic line) fluidly connecting the pump 260 to the actuator 130. In alternative embodiments, a load sensor (e.g., strain gauge, load cell, etc.) may additionally or alternatively be positioned on or near each leg 700 in order to measure the load on each leg. Each pressure sensor 232 is optionally in data communication with a controller 250 and/or user interface 300 for communicating inclination signals.

In some embodiments, the control system 200 optionally includes a first set of actuator valves 212 (e.g., flow control valves such as directional valves) fluidly coupling the pump 260 to each actuator 130 in the first actuator set 101. For example, a separate actuator valve 212 optionally selectively alternately communicates fluid to a head end and a rod end of the cylinder 132 of each of the actuators 130-1, 130-3, 130-4, 130-6. Each actuator valve 212 optionally comprises a remote-operated valve (e.g., electrohydraulic valve, pilot operated valve, etc.) in data communication with a controller 250 and/or a user interface 300 for receiving command signals.

In some embodiments, the control system 200 optionally includes a second set of actuator valves 222 (e.g., flow control valves such as directional valves) fluidly coupling the pump 260 to each actuator 130 in the second actuator set 102. For example, a separate actuator valve 222 optionally selectively alternately communicates fluid to a head end and a rod end of the cylinder 132 of each of the actuators 130-2 and 130-5. Each actuator valve 222 optionally comprises a remote-operated valve (e.g., electrohydraulic valve, pilot operated valve, etc.) in data communication with a controller 250 and/or a user interface 300 for receiving command signals.

In some embodiments, the control system 200 includes a first set of counterbalance valves 214 each in fluid communication with an associated actuator 130 of the first actuator set 101. The counterbalance valves 214 optionally retain a selected amount of fluid in each actuator 130 (e.g., in the head and rod ends of the cylinder 132) when the actuator extension is not being modified.

In some embodiments, the control system 200 includes a second set of counterbalance valves 224 each in fluid communication with an associated actuator 130 of the second actuator set 102. The counterbalance valves 224 optionally retain a selected amount of fluid in each actuator 130 (e.g., in the head and rod ends of the cylinder 132) when the degree of actuator extension is not being modified.

The controller 250 optionally comprises a programmable logic controller ("PLC"). The controller 250 is optionally in data communication with user interface 300.

Figure 3:
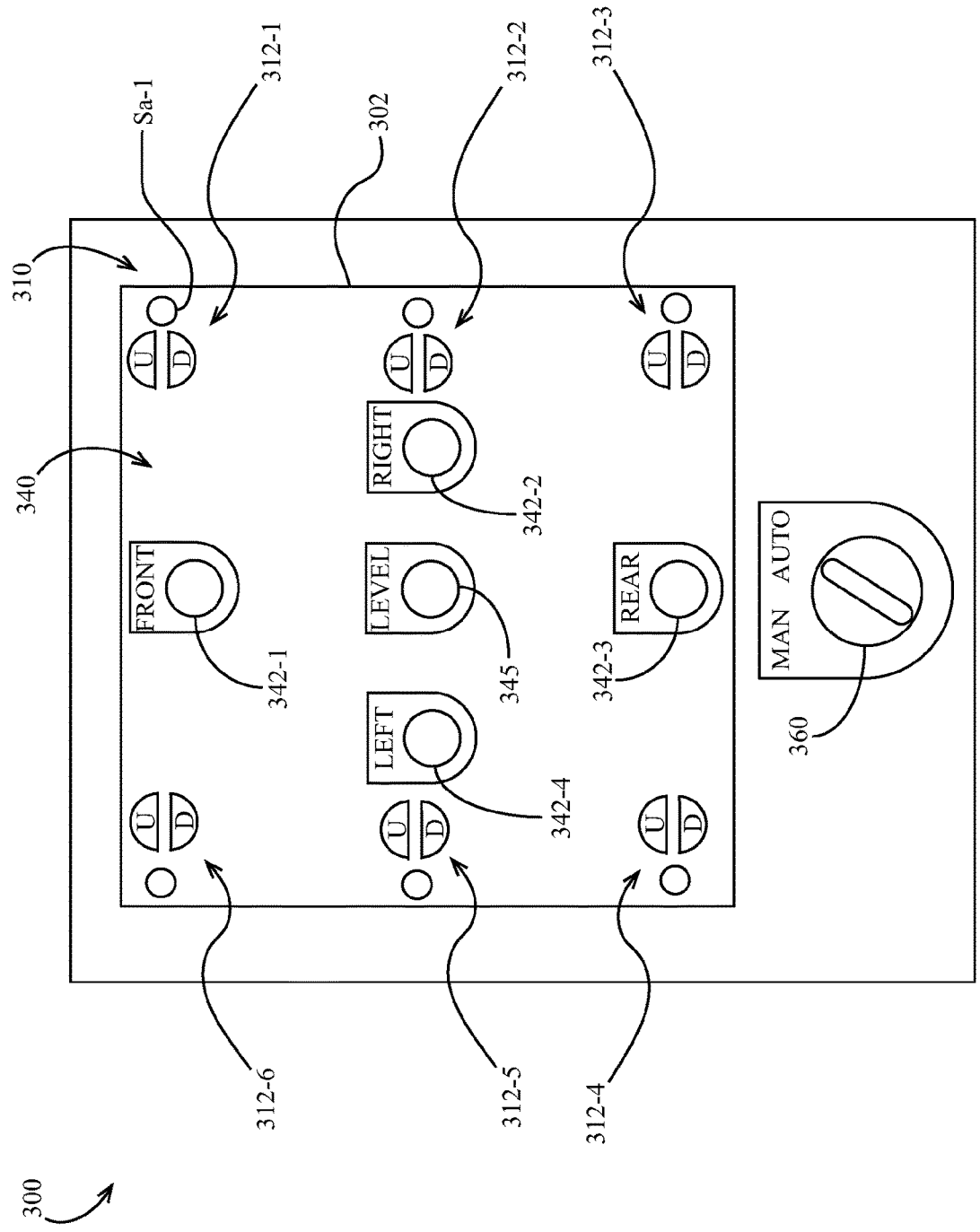
FIG. 3 schematically illustrates an embodiment of a control panel for controlling a leveling system.

An exemplary user interface 300 is illustrated in FIG. 3. The user interface 300 optionally includes a level indicator array 340 comprising a set of level indicators (e.g., lights such as LEDs) 342. In some embodiments, the controller 250 commands each level indicator to indicate (e.g., turn on a light which may have a predetermined color) when the associated side of the frame 150 is below (or above) a nominal level position and/or with respect to the remainder of the frame. For example, a front indicator 342-1 optionally indicates when the front end of the frame is out of level. Similarly, right indicator 342-2, rear indicator 342-3 and left indicator 342-4 optionally indicate when their associated sides of the frame 150 are out of level. In some embodiments, a level status of the frame (and/or each side of the frame) is determined with reference to the inclination sensors 282 and/or 284. For example, a signal outside of a predetermined range generated by the inclination sensor 282 may be used to determine that the front and/or rear sides of the frame 150 are out of level. Similarly, a signal outside of a predetermined range generated by the inclination sensor 284 may be used to determine that the left and/or right sides of the frame 150 are out of level. A level success indicator 345 is optionally commanded by the controller 250 to indicate when the entire frame is level and/or that all inclination sensor signals are within a predetermined range.

The user interface 300 optionally includes a control switch array 310 comprising a plurality of manual control switches 312 for commanding alternate extension and retraction of an actuator 130 associated with each control switch. In some embodiments, each control switch 312 is in data communication with the controller 250 which receives commands from the control switch 312 and transmits corresponding commands to the associated actuator valve. In other embodiments, each control switch is directly in data communication with the associated actuator valve. Each control switch 312 is optionally configured to selectively command one of two states of the associated actuator valve in order to extend or retract the associated actuator.

The indicator array 340 and controller array 310 may be disposed on a control panel and may be superimposed over a schematic representation 302 of the plant chassis 100. The schematic representation 302 may optionally include one or more schematic representations Sa indicating the locations of each leg 700 for user reference. For example, proximity of the schematic representation Sa-1 to the control switch 312-1 may indicate to the user that the control switch 312-1 is associated with the leg 700-a and/or with the front right corner of the frame 150.

In an exemplary use case provided for illustrative purposes, the right level indicator 342-2 may indicate that the right side of the frame 150 is below level. In response, a user may use the control switches 312 to raise the right side of the frame (e.g., using the control switches 312-1 and/or 312-3).

The user interface 300 optionally includes a switch 360 for switching the controller 250 between a manual mode in which the controller and/or actuator valves respond to the control switches 312 and an automatic mode in which the controller 250 carries out an automatic leveling routine to cause the actuators 130 to level and/or provide support to the frame 150.

Figure 5:
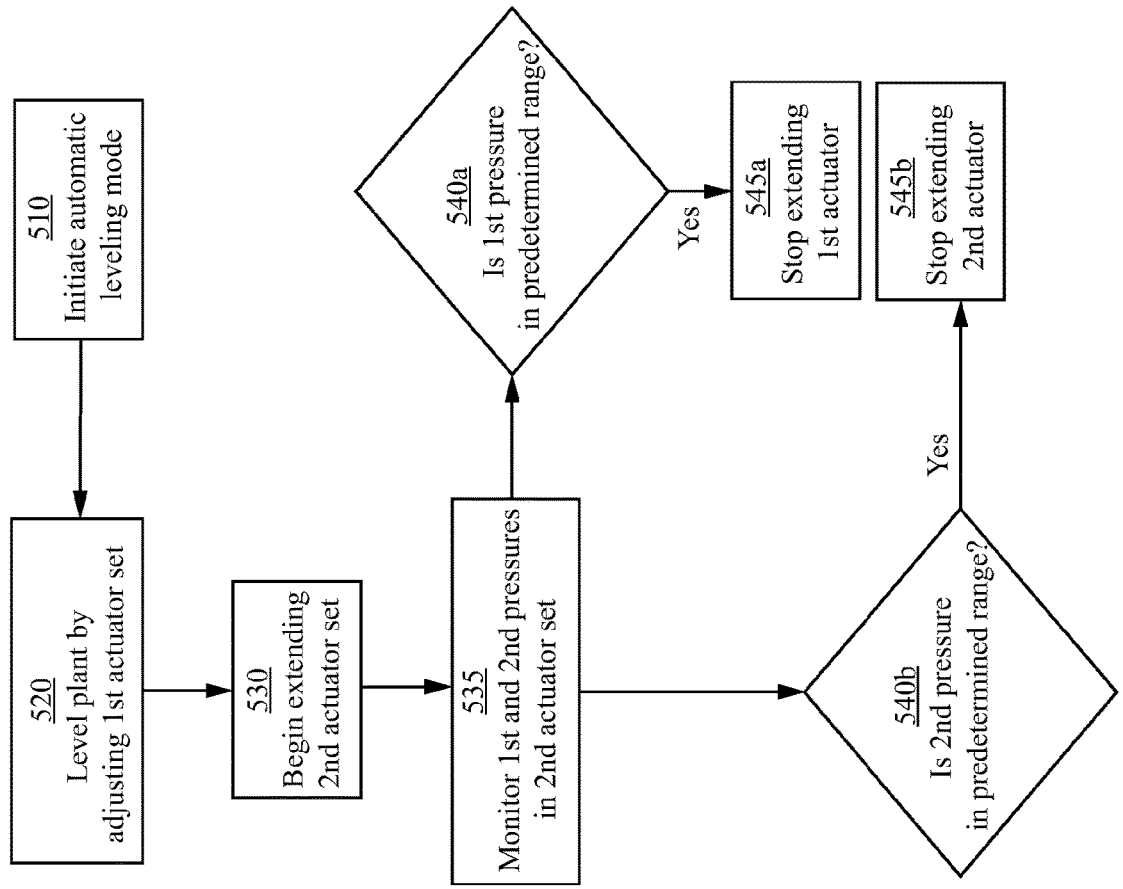
FIG. 5 illustrates an embodiment of a process for leveling and supporting a plant chassis.

An embodiment of an automatic leveling routine 500 is illustrated in FIG. 5. At step 510, the system 200 (e.g., the controller 250) optionally initiates an automatic leveling mode (e.g., upon receiving a command such as actuation of switch 360). At step 520, the system 200 optionally carries out a leveling routine using the first actuator set 101. An exemplary leveling routine 600 is described in more detail herein (e.g., with reference to FIG. 6). In some embodiments, the first actuator set 101 comprises the actuators disposed adjacent to corners of the frame 150. In some embodiments, after the leveling routine has been carried out, the frame is level and/or the inclination sensors or other sensors used to measure frame orientation generate signals within a predetermined (e.g., acceptable) range. After the leveling routine has been completed, at step 530 the system 200 optionally begins extending one or more (e.g., all) actuators in the second actuator set 102. At step 535, the system 200 (e.g., the controller 250) monitors the pressures (e.g., $1^{st}$ and $2^{nd}$ pressures) in the second actuator set. In some embodiments, step 535 is carried out at least in part by monitoring the signals generated by the pressure sensors 232. At one or more steps 540 (e.g., 540a, 540b), the system 200 (e.g., the controller 250) optionally determines whether each actuator pressure in the second actuator set 102 is within a predetermined range (e.g., within a range or above a threshold such as between 500 and 2000 psi, between 1000 and 3000 psi, between 1000 and 1500 psi, approximately 1100 psi, approximately 1200 psi, approximately 1300 psi, approximately 1400 psi, or any other range or threshold).

Once the pressure in a given actuator in the second actuator set 102 reaches the predetermined range, at one or more steps 540 (e.g., 540a, 540b) the system 200 optionally stops extending that actuator.

In some embodiments, step 535 is alternatively or additionally carried out by monitoring signals generated by a plurality of strain gauges or other devices configured to measure a load on each leg 700 and/or actuator 130 in the second actuator set 102. In other embodiments, the system 200 monitors a load on a portion of the frame or pressure in another component which is indicative of the load on the leg 700 and/or actuator 130.

In alternative embodiments, the actuators in the second actuator set 102 may alternatively be in fluid communication with and controlled by one or more pressure control valves (e.g., pressure reducing-relieving valves). In such embodiments, after step 520 the pressure control valves optionally cause each associated actuator in the second actuator set 102 to extend until a pre-determined actuator pressure (between 500 and 2000 psi, between 1000 and 3000 psi, between 1000 and 1500 psi, approximately 1100 psi, approximately 1200 psi, approximately 1300 psi, approximately 1400 psi) is reached.

Figure 6:
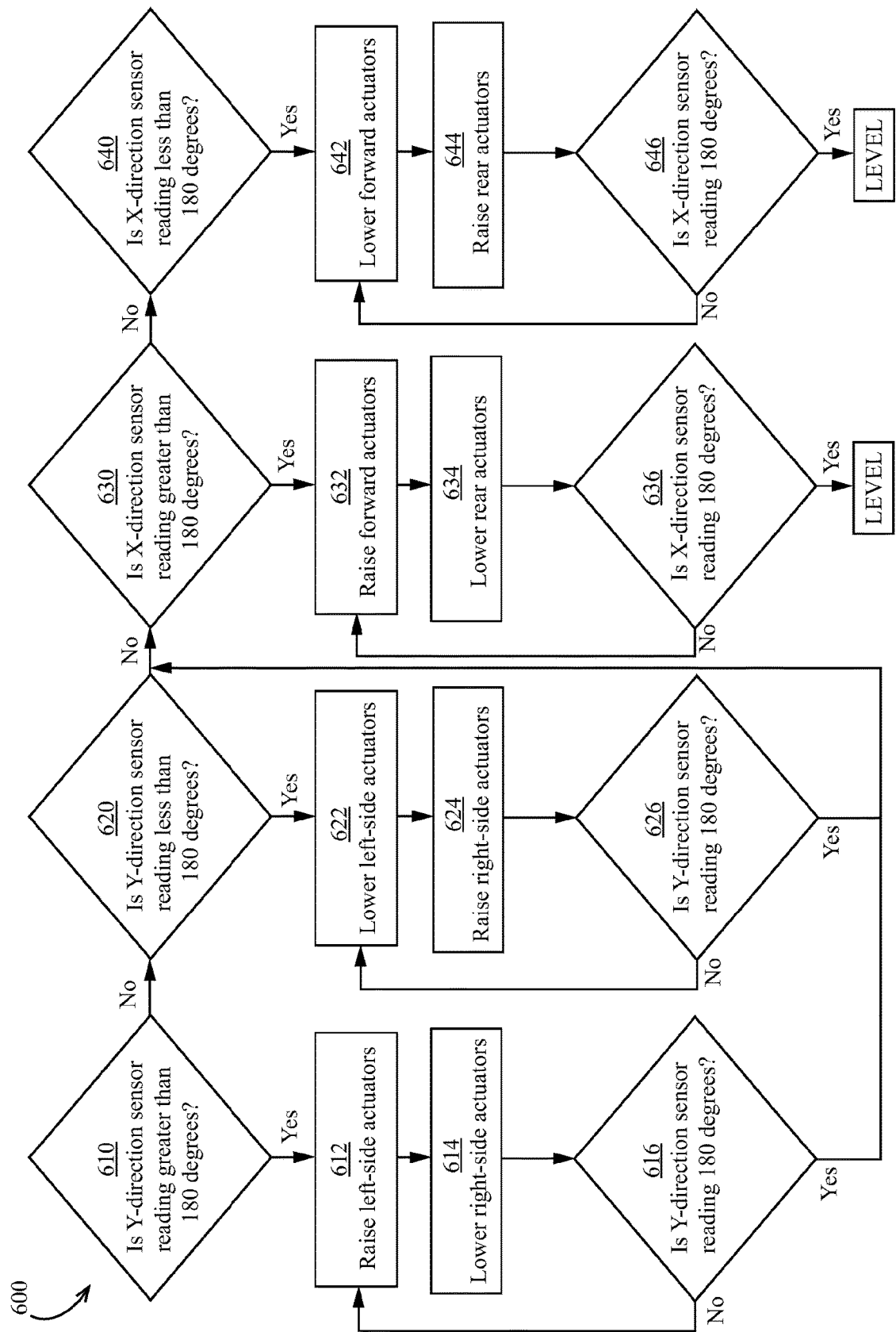
FIG. 6 illustrates an embodiment of a process for leveling a plant chassis.

Turning to FIG. 6, an exemplary leveling routine 600 is illustrated which is optionally carried out using the first actuator set 101 according to some embodiments. In various embodiments, the leveling routine may first balance the frame along the X direction or along the Y direction or balance both sides iteratively and/or simultaneously.

In the illustrated exemplary leveling routine 600, at step 610 the system 200 (e.g., the controller 250) optionally determines whether a Y-direction sensor reading (e.g., the signal generated by the inclination sensor 284 which may be represented by the illustrated angle B) is greater than 180 degrees.

If at step 610 the Y-direction sensor reading is greater than 180 degrees, then at step 612 the system 200 optionally raises (e.g., retracts) the left side actuators (e.g., actuators 130-4, 130-6 of the first actuator set 101) by an incremental distance and at step 614 the system optionally lowers (e.g., extends) the right side actuators (e.g., actuators 130-1, 130-3 of the first actuator set 101) by an incremental distance. In some embodiments, steps 612 and 614 are carried out at least partially simultaneously. The terms "left" and "right" as used herein may refer in some embodiments to the left and right sides of the frame 150 as viewed from the rear. At step 616, the system 200 (e.g., the controller 250) optionally determines whether the Y-direction sensor is reading 180 degrees (or within a threshold range such as between 175 and 185 degrees, between 178 and 182 degrees, between 179 and 181 degrees, approximately 180 degrees, etc.). If at step 616 the Y-direction sensor is not reading 180 degrees, the system 200 preferably iteratively repeats step 612 and/or 614 until the Y-direction sensor reads 180 degrees.

If at step 610 the Y-direction sensor reading is not greater than 180 degrees, then at step 620 the system 200 (e.g., the controller 250) optionally determines whether the Y-direction sensor reading (e.g., the signal generated by the inclination sensor 284) is less than 180 degrees.

If at step 620 the Y-direction sensor reading is less than 180 degrees, then at step 622 the system 200 optionally lowers (e.g., extends) the left side actuators (e.g., actuators 130-4, 130-6 of the first actuator set 101) by an incremental distance and at step 624 the system 200 optionally raises (e.g., retracts) the right side actuators (e.g., actuators 130-1, 130-3 of the first actuator set 101) by an incremental distance. At step 626, the system 200 (e.g., the controller 250) optionally determines whether the Y-direction sensor is reading 180 degrees (or within a threshold range such as between 175 and 185 degrees, between 178 and 182 degrees, between 179 and 181 degrees, approximately 180 degrees, etc.). If at step 626 the Y-direction sensor is not reading 180 degrees, the system 200 preferably iteratively repeats step 622 and/or 624 until the Y-direction sensor reads 180 degrees.

Once the Y-direction sensor reads 180 degrees or within a threshold range, at step 630 the system 200 (e.g., the controller 250) optionally determines whether an X-direction sensor reading (e.g., the signal generated by the inclination sensor 282 which may be represented by the illustrated angle A) is greater than 180 degrees.

If at step 630 the X-direction sensor reading is greater than 180 degrees, then at step 632 the system 200 optionally raises (e.g., retracts) the forward actuators (e.g., actuators 130-1, 130-6 of the first actuator set 101) by an incremental distance and at step 634 the system optionally lowers (e.g., extends) the rear actuators (e.g., actuators 130-3, 130-4 of the first actuator set 101) by an incremental distance. In some embodiments, steps 632 and 634 are carried out at least partially simultaneously. The terms "rear" and "forward" as used herein may refer in some embodiments to the portions of the frame which are farther from and closer to the towing connection 190, respectively. At step 636, the system 200 (e.g., the controller 250) optionally determines whether the X-direction sensor is reading 180 degrees (or within a threshold range such as between 175 and 185 degrees, between 178 and 182 degrees, between 179 and 181 degrees, approximately 180 degrees, etc.). If at step 636 the X-direction sensor is not reading 180 degrees, the system 200 preferably iteratively repeats step 632 and/or 634 until the X-direction sensor reads 180 degrees.

If at step 630 the X-direction sensor reading is not greater than 180 degrees, then at step 640 the system 200 (e.g., the controller 250) optionally determines whether the X-direction sensor reading (e.g., the signal generated by the inclination sensor 284) is less than 180 degrees.

If at step 640 the X-direction sensor reading is less than 180 degrees, then at step 642 the system 200 optionally lowers (e.g., extends) the forward actuators (e.g., actuators 130-1, 130-6 of the first actuator set 101) by an incremental distance and at step 644 the system 200 optionally raises (e.g., retracts) the rear actuators (e.g., actuators 130-3, 130-4 of the first actuator set 101) by an incremental distance. At step 646, the system 200 (e.g., the controller 250) optionally determines whether the X-direction sensor is reading 180 degrees (or within a threshold range such as between 175 and 185 degrees, between 178 and 182 degrees, between 179 and 181 degrees, approximately 180 degrees, etc.). If at step 646 the X-direction sensor is not reading 180 degrees, the system 200 preferably iteratively repeats step 642 and/or 644 until the X-direction sensor reads 180 degrees.

Once the X direction sensor reading is 180 degrees or within a threshold range, the frame may be determined to be level by the system 200 (e.g., the controller 250).

In various embodiments, the plant chassis described herein optionally include (e.g., additionally or alternatively) one or more features in common with the plant chassis embodiments described in U.S. Pat. Nos. 4,598,875 and/or 4,923,597; the entire disclosures of which are hereby incorporated by reference herein.

The term "data communication", as used herein, may refer to communication any suitable device or system for transferring a signal (e.g., electrical signal, pilot pneumatic signal), command, or other data, e.g., electrical communication, electronic communication, point-to-point electrical communication, serial bus communication, wireless communication, radio communication, etc.

Any ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A leveling system for leveling a plant chassis frame, the system comprising:
    a first set of actuators disposed to raise and lower the frame, each of said first set of actuators configured to alternately extend or retract an associated one of a first set of ground-engaging plant support legs;
    a second set of actuators disposed to raise and lower the frame, each of said second set of actuators configured to alternately extend or retract an associated one of a second set of ground-engaging plant support legs;
    a pressure sensor in fluid communication with at least one of said second set of actuators and configured to measure a pressure in said at least one of said second set of actuators, wherein said pressure is related to a load on at least one of said second set of ground-engaging plant support legs;
    a first set of valves in fluid communication with at least one of said first set of actuators;
    a second set of valves in fluid communication with at least one of said second set of actuators; and
    a programmable logic controller in data communication with said pressure sensor, said first set of valves, and said second set of valves, said programmable logic controller being configured to command said first set of valves to carry out a leveling routine, said programmable logic controller being configured to monitor a pressure signal generated by said pressure sensor, said programmable logic controller being configured to stop extension of at least one of said second set of ground-engaging plant support legs based on a value of said pressure signal.

2. The leveling system of claim 1, further comprising:
    a first inclination sensor mounted to the frame, said first inclination sensor being in data communication with said programmable logic controller, wherein said first inclination sensor is oriented to measure inclination along a first direction.

3. The leveling system of claim 2, further comprising:
    a second inclination sensor mounted to the frame, said second inclination sensor being in data communication with said programmable logic controller, wherein said second inclination sensor is oriented to measure inclination along a second direction different from said first direction.

4. The leveling system of claim 2, wherein said programmable logic controller is configured to consult said first inclination sensor in order to carry out said leveling routine.

5. The leveling system of claim 1, further comprising:
a user interface in data communication with said programmable logic controller.

6. The leveling system of claim 5, wherein said user interface comprises a control switch array, said control switch array comprising a plurality of manual control switches, each said control switch configured to alternately command extension and retraction of one of said first and second sets of actuators.

7. The leveling system of claim 5, wherein said user interface comprises a level indicator, said level indicator visually indicating whether the frame is level.

8. The leveling system of claim 5, wherein said user interface comprises a level indicator, said level indicator visually indicating whether a portion of the frame is level.

9. The leveling system of claim 5, wherein said user interface comprises a switch, said switch having a first position in which said programmable logic controller performs the leveling routine automatically, said switch having a second position in which said programmable logic controller does not perform the leveling routine.

10. The leveling system of claim 1, further comprising a mechanical locking mechanism associated with said plant support leg, said mechanical locking mechanism having a first configuration in which said plant support leg is allowed to extend and retract without interference by said mechanical locking mechanism, said mechanical locking mechanism having a second configuration in which the plant chassis frame is at least partially supported by said mechanical locking mechanism.

11. The leveling system of claim 1, further comprising:
a conveyor supported on the plant chassis frame.

12. The leveling system of claim 11, further comprising:
a rock crusher supported on the plant chassis frame.

13. The leveling system of claim 1, wherein the first set of actuators and the second set of actuators collectively comprise at least six actuators.

14. The leveling system of claim 1, wherein the first set of actuators and the second set of actuators collectively comprise at least eight actuators.

15. A method for leveling a plant chassis frame, the method comprising:
carrying out a leveling routine with a first set of actuators;
extending a plant support leg by extending at least one of a second set of actuators;
monitoring a load on said plant support leg by measuring a pressure in at least one of said second set of actuators; and
stopping extension of said one of said second set of actuators upon said pressure reaching a threshold value.

16. The method of claim 15, wherein the leveling routine comprises:
determining a first inclination of the frame along a first direction;
comparing said first inclination to a level inclination;
extending a first one of said first set of actuators; and
retracting a second one of said first set of actuators.

17. The method of claim 16, wherein the leveling routine further comprises:
determining a second inclination of the frame along a second direction;
comparing said second inclination to said level inclination;
extending a third one of said first set of actuators; and
retracting a fourth one of said first set of actuators.

18. The method of claim 16, wherein the leveling routine further comprises:
using a user interface, modifying a controller from a manual to an automatic mode.

19. The method of claim 15, wherein the leveling routine further comprises:
using a user interface, modifying a controller from a manual to an automatic mode.

* * * * *